(12) United States Patent
Klipper et al.

(10) Patent No.: US 10,294,313 B2
(45) Date of Patent: May 21, 2019

(54) PROCESS FOR PREPARING AMINOMETHYLATED BEAD POLYMERS

(71) Applicant: LANXESS Deutschland GmbH, Cologne (DE)

(72) Inventors: Reinhold Klipper, Cologne (DE); PIerre Vanhoorne, Monheim (DE)

(73) Assignee: LANXESS Deutschland GmbH, Cologne (DE)

( * ) Notice: Subject to any disclaimer, the term of this patent is extended or adjusted under 35 U.S.C. 154(b) by 65 days.

(21) Appl. No.: 14/918,714

(22) Filed: Oct. 21, 2015

(65) Prior Publication Data

US 2016/0108199 A1    Apr. 21, 2016

(30) Foreign Application Priority Data

Oct. 21, 2014 (EP) .................................... 14189673

(51) Int. Cl.

| | |
|---|---|
| *C08F 8/10* | (2006.01) |
| *B01J 45/00* | (2006.01) |
| *C08F 8/12* | (2006.01) |
| *C08F 8/30* | (2006.01) |
| *B01J 41/13* | (2017.01) |
| *C08F 212/08* | (2006.01) |
| *C08F 8/44* | (2006.01) |

(52) U.S. Cl.
CPC ................ *C08F 8/10* (2013.01); *B01J 41/13* (2017.01); *B01J 45/00* (2013.01); *C08F 8/12* (2013.01); *C08F 8/30* (2013.01); *C08F 8/44* (2013.01); *C08F 212/08* (2013.01); *C08F 2800/20* (2013.01)

(58) Field of Classification Search
CPC ........ C08F 8/30; C08F 212/08; C08F 257/00; C08F 257/02
See application file for complete search history.

(56) References Cited

U.S. PATENT DOCUMENTS

| | | | |
|---|---|---|---|
| 3,791,996 A * | 2/1974 | Wuchter | .................. C08F 8/32 521/31 |
| 3,882,053 A | 5/1975 | Corte et al. | |
| 3,925,264 A | 12/1975 | Corte et al. | |
| 4,232,125 A * | 11/1980 | Buske | ...................... B01J 41/14 521/32 |
| 4,382,124 A | 5/1983 | Meitzner et al. | |
| 4,427,794 A | 1/1984 | Lange et al. | |
| 4,444,961 A | 4/1984 | Timm | |
| 4,952,608 A * | 8/1990 | Klipper | ..................... C08F 8/30 521/32 |
| 5,231,115 A | 7/1993 | Harris | |
| 7,053,129 B1 | 5/2006 | Klipper et al. | |
| 2001/0043881 A1 * | 11/2001 | Wagner | ................. B01D 53/02 422/4 |
| 2016/0200887 A1 | 7/2016 | Klipper et al. | |

OTHER PUBLICATIONS

European Search Report from European Application No. 14189673, dated Apr. 17, 2015, two pages.

* cited by examiner

*Primary Examiner* — Robert C Boyle

(57) ABSTRACT

Aminomethylated bead polymers for use as ion exchangers, especially as anion exchangers, or for the preparation of chelate resins, are prepared in the presence of 1,3-dichloropropane as solvent and swelling agent.

12 Claims, No Drawings

PROCESS FOR PREPARING AMINOMETHYLATED BEAD POLYMERS

The invention relates to a process for preparing aminomethylated bead polymers and to the use thereof as ion exchangers, especially as anion exchangers, or for preparation of chelate resins.

BACKGROUND INFORMATION

DE-A 3733033, U.S. Pat. Nos. 7,053,129 and 3,925,264 disclose a process for preparing aminomethylated bead polymers, in which phthalimide is converted in the presence of formaldehyde and in the presence of bases and swelling agents, especially in 1,2-dichloroethane, to N-hydroxymethylphthalimide, which is converted in a further step under acid catalysis to bis(phthalimidomethyl) ether. This ether is reacted in the presence of Friedel-Crafts catalysts, especially in the presence of strong acids, with the bead polymer to give the phthalimidomethylated bead polymer. The phthalimidomethylated bead polymer is then hydrolyzed under alkaline conditions to give the aminomethylated bead polymer.

A further process for preparing aminomethylated bead polymers is known from U.S. Pat. No. 4,232,125 and PCT/EP2014/067109, in which phthalimide and paraformaldehyde and the bead polymer are converted, likewise in the presence of 1,2-dichloroethane as swelling agent, together with sulphuric acid as Friedel-Crafts catalyst, in a one-pot reaction in which the carbonium ion of methylphthalimide is formed as intermediate, to the phthalimidomethylated bead polymer. The phthalimidomethylated bead polymer is then hydrolyzed under alkaline conditions to give the aminomethytated bead polymer.

A disadvantage of the aforementioned processes is that the yields are unsatisfactory.

SUMMARY

There was therefore a need for a process in which aminomethylated bead polymers can be prepared with high yields.

It has surprisingly been discoerd that higher yields of aminomethylated bead polymers can be achieved using 1,3-dichloropropane as solvent and swelling agent.

DETAILED DESCRIPTION

The invention therefore provides a process for preparing aminomethylated bead polymers, characterized in that
a) monomer droplets composed of a mixture comprising at least one monoethylenically unsaturated aromatic compound, at least one multiethylenically unsaturated compound and at least one initiator are converted to a bead polymer;
b) the bead polymer from step a) is reacted with:
compounds of the formula (I) or salts thereof

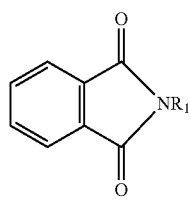

(I)

where $R_1 = C_1\text{-}C_3$-alkyl or H, and compounds of the formula (II)

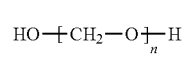

(II)

where n=1 to 100, in the presence of 1,3-dichloropropane, and in the presence of protic acids, to give a phthalimidomethylated bead polymer; and
c) the phthalimidomethyated bead polymer is hydrolyzed to give an aminomethylated bead polymer.

$R_1$ is preferably H. If $R_1$=H, the compound of the formula (I) is phthalimide. Compounds of the formula (I) are preferably phthalimide and salts thereof. These may be understood to mean, for example, the adducts with hydrochloric acid or sulphuric acid. Preferably, the salts of the compounds of the formula (I) are quaternary phthalimide adducts formed from phthalimide and sulphuric acid.

Preferably, n=8 to 100. More preferably, n=about 8 to about 15. If n=1, the compounds of the formula (II) are formaldehyde.

The compounds of the formula (II) may be linear or else cyclic condensates of formaldehyde, including trioxane for example. Particular preference is given to using, as compounds of the formula (II), formaldehyde, paraformaldehyde or trioxane or mixtures of these compounds. More preferably, the compounds of the formula (II) are formaldehyde and paraformaldehyde with n=8 to 100. Most preferably, the compound of the formula (II) is paraformaldehyde with n=8 to 100.

Protic acids used may, for example, be inorganic or organic protic acids. Inorganic protic acids used are, for example, hydrochloric acid, sulphuric acid, oleum, nitric acid, nitrous acid, sulphurous acid or phosphoric acid. Organic protic acids used may, for example, be oxalic acid or formic acid. Preference is given to using inorganic protic acids. Protic acids used are more preferably sulphuric acid, hydrochloric acid or oleum. Even further preferably, sulphuric acid is used.

The scope of the invention encompasses all radical definitions, parameters and elucidations above and detailed hereinafter, in general terms or mentioned within areas of preference, together with one another, i.e. including any combinations between the respective areas and areas of preference. The included ranges are example ranges, or preferred example ranges and are intended to encompasses ranges between any numbers within the designated ranges as well as the designated endpoints of the ranges. In this context, a designated range of 8 to 100, also encompasses, for example, ranges of 50 to 100, 8 to 40, and 20 to 80.

Step a) of the process uses at least one monovinylaromatic compound and at least one polyvinylaromatic compound. However, it is also possible to use mixtures of two or more monovinylaromatic compounds or mixtures of two or more polyvinylaromatic compounds.

For the purposes of the present invention, the monovinylaromatic compounds used in step a) of the process are preferably styrene, vinyltoluene, ethylstyrene, α-methylstyrene, chlorostyrene, chloromethylstyrene, alkyl acrylates or alkyl methacrylates.

It is especially preferable to use styrene or mixtures of styrene with the abovementioned monomers, preferably with ethylstyrene.

For the purposes of the present invention, preferred polyvinylaromatic compounds for process step a) are divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate and allyl methacrylate, especially preferably divinylbenzene.

The polyvinylaromatic compounds are preferably used in amounts of 1%-20% by weight, more preferably about 2% to about 12% by weight, especially preferably about 4 to about 10% by weight, based on the monomer or mixture thereof with other monomers. The nature of the polyvinylaromatic compounds (crosslinkers) is selected with regard to the later use of the bead polymer. In the case of use of divinylbenzene, commercial qualities of divinylbenzene also comprising ethylvinylbenzene as well as the isomers of divinylbenzene are adequate.

The term "bead polymer" in the context of the invention is a crosslinked polymer in bead form.

The terms "microporous" or "in gel form" and "macroporous" have already been described in detail in the specialist literature.

Macroporous bead polymers are formed by addition of inert materials, preferably at least one porogen, to the monomer mixture in the course of polymerization, in order to produce a macroporous structure in the bead polymer. Especially preferred porogens are hexane, octane, isooctane, isododecane, methyl ethyl ketone, butanol or octanol, and isomers thereof. Particularly suitable substances are organic substances which dissolve in the monomer but dissolve or swell the bead polymer sparingly (precipitant for polymers), for example aliphatic hydrocarbons (Farbenfabriken Bayer DBP 1045102, 1957; DBP 1113570, 1957).

U.S. Pat. No. 4,382,124 uses, as porogen, the alcohols having about 4 to about 10 carbon atoms which are likewise to be used with preference in the context of the present invention for preparation of monodisperse, macroporous bead polymers based on styrene/divinylbenzene. In addition, an overview of the preparation methods for macroporous bead polymers is given.

Preferably, in process step a), at least one porogen is added. Preferably, the aminomethylated bead polymers have a macroporous structure.

The bead polymers prepared in process step a) can be prepared in heterodisperse or monodisperse form.

The preparation of heterodisperse bead polymers is accomplished by general processes known to those skilled in the art, for example with the aid of suspension polymerization.

Preference is given to preparing monodisperse bead polymers in process step a).

In the present application, monodisperse materials are those in which at least about 90% by volume or % by mass of the particles have a diameter within about ±10% of the most common diameter.

For example, in the case of a material having a most common diameter of about 0.5 mm, at least about 90% by volume or % by mass has a size range of about 0.45 mm to about 0.55 mm; in the case of a material having a most common diameter of about 0.7 mm, at least about 90% by volume or % by mass has a size range of about 0.77 mm to about 0.63 mm.

In a preferred embodiment of the present invention, in process step a), microencapsulated monomer droplets are used in the preparation of monodisperse bead polymers.

Useful materials for the microencapsulation of the monomer droplets are those known for use as complex coacervates, especially polyesters, natural and synthetic polyamides, polyurethanes or polyureas.

Gelatin is a natural polyamide used with preference. This is especially employed in the form of coacervate and complex coacervate. For the purposes of the invention, gelatin-containing complex coacervates are, in particular, combinations of gelatin with synthetic polyelectrolytes. Suitable synthetic polyelectrolytes are copolymers incorporating units of, for example, maleic acid, acrylic acid, methacrylic add, acrylamide and methacrylamide. Particular preference is given to acrylic acid and acrylamide. Gelatin-containing capsules can be hardened with conventional hardeners, for example formaldehyde or glutaraldehyde. The encapsulation of monomer droplets with gelatin, gelatin-containing coacervates and gelatin-containing complex coacervates is described in detail in EP-A 0 046 535. The methods for encapsulation with synthetic polymers are known. Preference is given to phase interfacial condensation, in which a reactive component dissolved in the monomer droplet (especially an isocyanate or an acid chloride) is reacted with a second reactive component dissolved in the aqueous phase (especially an amine).

The optionally microencapsulated monodisperse monomer droplets contain at least one initiator or mixtures of initiators (initiator combination) to trigger the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methylisobutyronitrile).

The initiators are preferably used in amounts of about 0.05% to about 2.5% by weight, more preferably about 0.1% to about 1.5% by weight, based on the monomer mixture.

The optionally microencapsulated monodisperse monomer droplets may optionally also contain up to about 30% by weight (based on the monomer) of crosslinked or uncrosslinked polymer. Preferred polymers derive from the aforementioned monomers, more preferably from styrene.

In the preparation of monodisperse bead polymers, in process step a), the aqueous phase, in a further preferred embodiment, may comprise a dissolved polymerization inhibitor. In this case, useful inhibitors are either inorganic or organic substances. Preferred inorganic inhibitors are nitrogen compounds, especially preferably hydroxylamine, hydrazine, sodium nitrite and potassium nitrite, salts of phosphorous acid such as sodium hydrogen phosphite, and sulphur compounds such as sodium dithionite, sodium thiosulphate, sodium sulphite, sodium bisulphite, sodium thiocyanate and ammonium thiocyanate. Examples of organic inhibitors are phenolic compounds such as hydroquinone, hydroquinone monomethyl ether, resorcinol, pyrocatechol, tert-butylpyrocatechol, pyrogallol and condensation products of phenols with aldehydes. Further preferred organic inhibitors are nitrogen compounds. Especially preferred are hydroxylamine derivatives, for example N,N-diethylhydroxylamine, N-isopropylhydroxylamine and sulphonated or carboxylated N-alkylhydroxylamine or N,N-dialkylhydroxylamine derivatives, hydrazine derivatives, for example N,N-hydrazinodiacetic acid, nitroso compounds, for example N-nitrosophenylhydroxylamine, N-nitrosophenylthydroxylamine ammonium salt or N-nitrosophenylhydroxylamine aluminum salt. The concentration of the inhibitor is about 5 to about 1000 ppm (based on the aqueous phase), preferably about 10 to about 500 ppm, and more preferably about 10 to about 250 ppm.

The polymerization of the optionally microencapsulated monodisperse monomer droplets to give the monodisperse bead polymer is effected, as already mentioned above, optionally or preferably in the presence of one or more protective colloids in the aqueous phase. Suitable protective colloids are natural or synthetic water-soluble polymers, preferably gelatin, starch, polyvinyl alcohol, polyvinylpyrrolidone, polyacrylic acid, polymethacrylic acid or copolymers of (meth)acrylic acid and (meth)acrylic esters. Preference is further given to cellulose derivatives, especially cellulose esters and cellulose ethers, such as carboxymethyl cellulose, methyl hydroxyethyl cellulose, methyl hydroxypropyl cellulose and hydroxyethyl cellulose. Gelatin is especially preferred. The amount of the protective colloids used is generally about 0.05% to about 1% by weight, based on the aqueous phase, and preferably about 0.05% to about 0.5% by weight.

The polymerization to give the monodisperse bead polymer can, in an alternative preferred embodiment, be conducted in the presence of a buffer system. Preference is given to buffer systems which set the pH of the aqueous phase on commencement of the polymerization to a value of about 14 to about 6, preferably about 12 to about 8. Under these conditions, protective colloids having carboxylic acid groups are present wholly or partly as salts. This causes a favourable effect on the action of the protective colloids. Particularly suitable buffer systems contain phosphate or borate salts. The terms "phosphate" and "borate" in the context of the invention also encompass the condensation products of the ortho forms of corresponding acids and salts. The concentration of the phosphate or borate in the aqueous phase is about 0.5 to about 500 mmol/I, and preferably about 2.5 to about 100 mmol/l.

The stirrer speed in the polymerization to give the monodisperse bead polymer is less critical and, in contrast to conventional bead polymerization, has no effect on the particle size. Low stirrer speeds are employed, these being sufficient to keep the suspended monomer droplets in suspension and to promote the removal of the heat of polymerization. For this task, it is possible to use various stirrer types. Particularly suitable stirrers are gate stirrers having axial action.

The volume ratio of encapsulated monomer droplets to aqueous phase is about 1:0.75 to about 1:20, and preferably about 1:1 to about 1:6.

The polymerization temperature to give the monodisperse bead polymer is guided by the decomposition temperature of the initiator used, and is generally about 50 to about 180° C., preferably about 55 to about 130° C. The polymerization takes about 0.5 hour to about 20 hours. It has been found to be useful to employ a temperature programme in which the polymerization is commenced at low temperature, for example about 60° C., and the reaction temperature is raised with increasing polymerization conversion. In this way, for example, the requirement for reliable running of the reaction and high polymerization conversion can be fulfilled very efficiently. After the polymerization, the monodisperse bead polymer is isolated by conventional methods, for example by filtering or decanting, and washed where appropriate.

The preparation of the monodisperse bead polymers with the aid of the jetting principle or the seed-feed principle is known from the prior art and described, for example, in U.S. Pat. No. 4,444,961, EP-A 0 046 535, U.S. Pat. No. 4,419,245 or WO 93/12167.

Preference is given to preparing the monodisperse bead polymers with the aid of the jetting principle or the seed-feed principle.

Preference is given to preparing, in process step a.), a macroporous, monodisperse bead polymer.

1,3-Dichloropropane is a swelling agent for the bead polymers, but likewise serves as solvent for the further reactants in the amidation reaction and is therefore a solvent and swelling agent for the purposes of the invention. In process step b), it is also possible to add further organic solvents and swelling agents. Further organic solvents and swelling agents added may, for example, be 1,2-dichloroethane, 1,2-dichloropropane, 1,4-dichlorobutane, 1,6-dichlorohexane, methylene chloride, carbon tetrachloride, trichloroethane, chlorobenzene, 1,2-dichlorobenzene, or nitro-substituted hydrocarbons, for example nitropropane, nitrobenzene or, for example, cyclic hydrocarbons, for example cyclohexane and methylcyclohexane. Preference is given to using no further organic solvents and swelling agents in process step b.).

In general, the proportion of 1,3-dichloropropane in organic solvents and swelling agents used is greater than 90% by weight, but it may also be smaller. Preferably, the proportion of 1,3-dichloropropane in organic solvents and swelling agents used in process step b.) is greater than 90% by weight. More preferably, the proportion of 1,3-dichloropropane in organic solvents and swelling agents used in process step b.) is greater than about 95% by weight. Most preferably, the proportion of 1,3-dichloropropane in organic solvents and swelling agents used in process step b.) is greater than about 98% by weight.

Process step b) is generally conducted at temperatures of about 40 to about 80° C., but may likewise be conducted at lower or higher temperatures. Preferably, process step b) is conducted at temperatures of about 55° C. to about 75° C.

Process step b) can be conducted in different ways. For example, it would be possible first to prepare the amidomethylating reagent. For this purpose, the compounds of the formula (I) are dissolved in 1,3-dichloropropane or in mixtures of this solvent and swelling agent with further solvents and swelling agents, and compounds of the formula (II) are added. Subsequently, an ether is formed therefrom with elimination of water. This ether can optionally be converted to the ester. In process step b), the bead polymer is condensed with compounds of the formula (II). The catalysts used here are protic acids. Preference is given to using sulphuric acid as protic acid. Particular preference is given to using sulphuric acid monohydrate as protic acid. The sulphuric acid is preferably used in a concentration of about 90% to about 102% by weight, more preferably in a concentration of about 98% to about 102% by weight. A stated amount of more than 100% by weight means that 100% by weight of $H_2SO_4$ is present and the additional proportion originates from free $SO_3$. Accordingly, the figure of 102% by weight means that 100% by weight of $H_2SO_4$ is present and 2% by weight of free $SO_3$.

However, it would likewise be possible first to swell the bead polymer and to mix it in this state with a mixture of the compounds of the formula (I) and the compounds of the formula (II) and the protic acids. However, it would be equally possible first to add the compounds of the formula (I) to the bead polymer in the presence of 1,3-dichloropropane and then to add the compound of the formula (II) and then the protic acids. Preferably, the bead polymer is first swollen in the presence of 1,3-dichloropropane and optionally further solvents and swelling agents, and then the compounds of the formula (I) and the compounds of the formula (II) are added and then the protic acids are added when the compound of the formula (II) used is paraformaldehyde. Preferably, the reaction mixture is heated. Preferably, the phthalimidomethylated bead polymer is prepared via the intermediate stage of the preparation of an amidomethylating reagent when the compound of the formula (II) used is formaldehyde. The removal of 1,3-dichloropropane or/and the possible further solvents and swelling agents added is preferably effected by distillation. The reaction products are worked up by processes known to those skilled in the art.

The amount of compounds of the formula (I) which is used in process step b) is generally about 3.5 to about 1.7 mol per mole of protic acid, but may also be less or greater. Preference is given to using about 2 to about 2.5 mol of compounds of the formula (I) per mole of protic acid.

The amount of 1,3-dichloropropane which is used in process step b) is generally about 3.5 to about 13 mol per mole of compounds of the formula (I), but may also be less or greater. Preference is given to using about 5 to about 10 mol of 1,3-dichloropropane per mole of compounds of the formula (I). Particular preference is given to using about 6 to about 9 mol of 1,3-dichloropropane per mole of compounds of the formula (I).

The amount of 1,3-dichloropropane which is used in process step b) s generally about 7.5 to about 13 mol per mole of bead polymer, but may also be less or greater. Preference is given to using about 7.5 to about 12 mol of 1,3-dichloropropane per mole of bead polymer.

In general, the conversion of the phthalimidomethylated bead polymer to the aminomethylated bead polymer in process step c.) is effected with aqueous or alcoholic solutions of an alkali metal hydroxide such as sodium hydroxide or potassium hydroxide. In addition, process step c.) is generally conducted at temperatures of about 100° C. to about 250° C., but may alternatively be conducted at higher or lower temperatures. Preferably, process step c.) is conducted at temperatures of about 120° C. to about 190° C. Preferably, the conversion of the phthalimidomethylated bead polymer to the aminomethylated bead polymer in process step c.) is effected with alkali metal or alkaline earth metal hydroxides or mixtures of these compounds, more preferably with alkali metal hydroxides, such as sodium hydroxide in particular. Preferably, the conversion in process step c.) proceeds in the presence of an aqueous or alcoholic solution of an alkali metal hydroxide. The concentration of the sodium hydroxide solution is about 10% to about 50% by weight, preferably about 20% to about 40% by weight. The resultant aminomethytated bead polymer is preferably washed with demineralized water to free it of alkaline, but may alternatively be treated with other aqueous solutions or non-demineralized water.

The aminomethylated bead polymer may be used as anion exchanger or be converted further to chelate resins.

The conversion of the aminomethylated bead polymers obtained in process step c) to chelate resins is effected by standard methods known to those skilled in the art.

For example, chelate resins containing iminodiacetic acid groups can be prepared by reacting the aminomethyl group-containing bead polymer from process step c) in aqueous suspension with chloroacetic acid or derivatives thereof. It is likewise possible to react the aminomethylated bead polymers obtained in process step c.) in sulphuric acid suspension with formalin in combination with P—H-acidic compounds (via a modified Mannich reaction) to give chelate resins having phosphonic acid groups.

The use of the aminomethylated bead polymers prepared in accordance with the invention for preparation of ion exchangers, especially anion exchangers and chelate resins, is likewise encompassed by the invention.

With the aid of the process according to the invention, it is possible to prepare aminomethylated bead polymers with high yields, based on the amount of aminomethyl groups introduced, and additionally to reduce or entirely avoid the use of environmentally unsound solvents and swelling agents.

EXAMPLES

Example 1

According to the Invention 1.1 Preparation of the Monodisperse Macroporous Bead Polymer Based on Styrene, Divinylbenzene and Ethylstyrene A 10 l glass reactor is charged with 3000 g of demineralized water, and a solution of 10 g of gelatin, 16 g of disodium hydrogenphosphate dodecahydrate and 0.73 g of resorcinol in 320 g of deionized water is added and mixed in. The mixture is equilibrated to 25° C. Subsequently, while stirring, a mixture of 3200 g of microencapsulated monomer droplets having a narrow particle size distribution, composed of 3.1% by weight of divinylbenzene and 0.6% by weight of ethylstyrene (used in the form of a commercial isomer mixture of divinylbenzene and ethylstyrene with 80% divinylbenzene), 0.4% by weight of dibenzoyl peroxide, 58.6% by weight of styrene and 37.5% by weight of isododecane (technical isomer mixture having a high proportion of pentamethylheptane) is applied, the microcapsule consisting of a formaldehyde-hardened complex coacervate composed of gelatin and a copolymer of acrylamide and acrylic acid, and 3200 g of aqueous phase having a pH of 12 are added. The mean particle size of the monomer droplets is 460 μm.

The mixture is stirred and polymerized to completion by increasing the temperature in accordance with a temperature programme beginning at 25° C. and ending at 95° C. The mixture is cooled, washed through a 32 μm sieve and then dried at 80° C. under reduced pressure. This gives 1893 g of a polymer in bead form having a mean particle size of 440 μm, narrow particle size distribution and smooth surface.

The polymer has a chalky white appearance and a bulk density of about 440 g/l.

1.2 Preparation of a Phthalimidomethylated Monodisperse Macroporous Bead Polymer Apparatus: 4-liter four-neck flask, metering funnel, thermometer, heating bath, stirrer At room temperature, 1190 g of 1,3-dichloropropane are initially charged. Into the latter are metered 150 g of monodisperse macroporous bead polymer from example 1.1, 268.3 g of phthalimide and 61.4 g of 91% by weight paraformaldehyde (n=8-100) (remainder: water). The suspension is stirred at room temperature for 0.5 hour. Then the suspension is heated to 60° C. At this temperature, the mixture is stirred for 1.0 hour. Within 2 hours, 357.6 g of sulphuric acid monohydrate are then metered in at 60° C. Subsequently, the suspension is then stirred at this temperature for 3 hours. The warm reaction broth is filtered off with suction. 2 liters of demineralized water are metered in. Residual amounts of 1,3-dichloropropane are removed by distillation. The mixture is then cooled and the volume of resin is determined.

Volume yield: 870 ml

Dry weight: 0.443 g per ml of resin

Proportion by mass of nitrogen: 5.3% by weight 1.3 Preparation of a Monodisperse Macroporous Bead Polymer Containing Aminomethyl Groups Apparatus: 4-liter autoclave, stirrer, thermometer At room temperature, 489 ml of demineralized water are initially charged. Into the latter are metered 351.5 g of 50% by weight sodium hydroxide solution. While stirring, 846 ml of resin prepared according to example 1.1 are metered in.

The suspension is heated to 180° C. and stirred at this temperature for a further 5 hours. Thereafter, the suspension is cooled. The resultant bead polymer is removed by means of a sieve and washed to neutrality with demineralized water.

Volume yield: 700 ml

Scaled up to the total yield of resin from 1.2: 710 ml

Total amount of base formed—product of HCl number and total resin yield: 1675 mmol HCl number: 2.36 mol/l First substitution: 1.17

1.4 Preparation of a Monodisperse Macroporous Bead Polymer Containing Iminodiacetic Acid Groups Apparatus: 3-liter jacketed reactor, stirrer, thermometer, condenser, Prominent Dulcometer PHD metering pump with pH measurement electrode, graduated dropping funnel 402 ml of water are initially charged at room temperature. Into the latter are metered 670 ml of resin prepared from example 1.3. The suspension is heated to 95° C. Within 7 hours, 616.4 grams of 80% by weight monochloroacetic acid are metered in. In the course of this, the pH of the suspension is kept at 9.2 with 50% by weight sodium hydroxide solution. Subsequently, the pH is increased to 10.2 and the mixture is stirred at this temperature for a further 4 hours.

Thereafter, the mixture is cooled. The suspension is applied to a sieve. The resin is washed with water.

Volume yield shaken in: 1250 ml

Total capacity: 2.99 mol/l

Second substitution: 1.91

Dry weight: 18.57 g

Comparative Example 1

1.1 Preparation of Anion Exchangers and a Chelate Resin Having Iminoacetic Acid Groups, with the Working Medium 1,2-Dichloroethane Apparatus: 4-liter four-neck flask, metering funnel, thermometer, heating bath, stirrer At room temperature, 1190 g of 1,2-dichloroethane are initially charged. Into the latter are metered 150 g of monodisperse macroporous bead polymer from example 1.1, 268.3 g of phthalimide and 61.4 g of 91% by weight paraformaldehyde (n=8-100) (remainder water). The suspension is stirred at room temperature for 0.5 hour. Then the suspension is heated to 60° C. At this temperature, the mixture is stirred for 1.0 hour. Within 2 hours, 357.6 g of sulphuric acid monohydrate are then metered in at 60° C. Subsequently, the suspension is then stirred at this temperature for 3 hours. The warm reaction broth is filtered off with suction. 2 liters of demineralized water are metered in. Residual amounts of 1,2-dichloroethane are removed by distillation. The mixture is then cooled and the volume of resin is determined.

Volume yield: 858 ml

Dry weight: 0.473 g per ml of resin

Proportion by mass of nitrogen: 5.5% by weight 1.2 Preparation of a Monodisperse Macroporous Bead Polymer Containing Aminomethyl Groups Apparatus: 4-liter autoclave, stirrer, thermometer At room temperature, 489 g of demineralized water are initially charged. Into the latter are metered 351.5 g of 50% by weight sodium hydroxide solution. While stirring, 846 ml of resin prepared according to example 3.1 are metered in.

The suspension is heated to 180° C. and stirred at this temperature for a further 5 hours. Thereafter, the suspension is cooled. The resultant bead polymer is removed by means of a sieve and washed to neutrality with demineralized water.

Volume yield: 714 ml

Scaled up to the total yield of resin from CE 1.1: 727 ml

Total amount of base formed—product of HCl number and total resin yield: 1578 mmol HCl number 2.17 mol/l First substitution: 1.14

Comparative Example 2

2.1 Preparation of Anion Exchangers, with the Working Medium 1,2-Dichloropropane Apparatus: 4-liter four-neck flask, metering funnel, thermometer, heating bath, stirrer At room temperature, 1190 g of 1,2-dichloropropane are initially charged. Into the latter are metered 150 g of monodisperse macroporous bead polymer from example 1, 268.3 g of phthalimide and 61.4 g of 91% by weight paraformaldehyde (n=8-100) (remainder: water). The suspension is stirred at room temperature for 0.5 hour. Then the suspension is heated to 60° C. At this temperature, the mixture is stirred for 1.0 hour. Within 2 hours, 357.6 g of sulphuric acid monohydrate are then metered in at 60° C. Subsequently, the suspension is then stirred at this temperature for 3 hours. The warm reaction broth is filtered off with suction. 2 liters of demineralized water are metered in. Residual amounts of 1,2-dichloropropane are removed by distillation. The mixture is then cooled and the volume of resin is determined.

Volume yield: 550 ml

Dry weight: 0.444 g per ml of resin

Proportion by mass of nitrogen: 3.4% by weight 2.2 Preparation of a Monodisperse Macroporous Bead Polymer Containing Aminomethyl Groups Apparatus: 4-liter autoclave, stirrer, thermometer At room temperature, 350 g of demineralized water are initially charged. Into the latter are metered 148.3 g of 50% by weight sodium hydroxide solution. While stirring, 526 ml of resin prepared according to example 3.1 are metered in.

The suspension is heated to 180° C. and stirred at this temperature for a further 5 hours. Thereafter, the suspension is cooled. The resultant bead polymer is removed by means of a sieve and washed to neutrality with demineralized water.

Volume yield: 450 ml

Scaled up to the total yield of resin from CE 2.1: 471 ml

Total amount of base formed—product of HCl number and total resin yield: 593 mmol HCl number 1.26 mol/l First substitution: 0.5

Summary of the Results

| Index of the aminomethylated stage | 1,2-Dichloroethane (Comparative Example 1) | 1,2-Dichloropropane (Comparative Example 2) | 1,3-Dichloropropane (Example 1) |
|---|---|---|---|
| Amount of base at this stage (mmol) | 1578 | 594 | 1675 |

| Index of the aminomethylated stage | 1,2-Dichloro-ethane (Comparative Example 1) | 1,2-Dichloro-propane (Comparative Example 2) | 1,3-Dichloro-propane (Example 1) |
|---|---|---|---|
| Substitution level of the aromatic rings by aminomethyl groups | 1.14 | 0.5 | 1.17 |
| HCl number (mol/l) | 2.17 | 1.26 | 2.36 |

Example 1 demonstrates that, using 1,3-dichloropropane as solvent and swelling agent, the substitution level of the aromatic rings by aminomethyl groups is greater than compared with the other solvents and swelling agents, meaning that a higher yield of aminomethylated bead polymer can be achieved.

What is claimed is:

1. A process for preparing aminomethylated bead polymers, the process comprising:
    contacting monodisperse bead polymer comprising units based on styrene and divinylbenzene with:
    compounds of the formula (I) or salts thereof

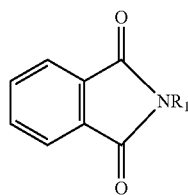

(I)

where $R_1 = C_1$-$C_3$-alkyl or H,
compounds of the formula (II)

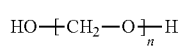

(II)

where n=8 to 100,
1,3-dichloropropane, and
sulfuric acid,
wherein:
    about 7.5 to about 13 mol of the 1,3-dichloropropane is used per mole of the bead polymer; and
    about 3.5 to about 13 mol of the 1,3-dichloropropane is used per mole of the compounds of the formula (I);
to produce phthalimidomethylated bead polymer; and
hydrolysing the phthalimidomethylated bead polymer to produce aminomethylated bead polymer.

2. The process according to claim 1, wherein $R_1$=H.

3. The process according to claim 1, wherein the 1,3-dichloropropane is both a solvent and a swelling agent in the process, and the amount of 1,3-dichloropropane used, based on a total amount of solvents and swelling agents used, is greater than 90% by weight.

4. The process according to claim 1, wherein the contacting is conducted at a temperature of about 55° C. to about 75° C.

5. The process according to claim 1, wherein the contacting comprises:

swelling the bead polymer in the 1,3-dichloropropane to form swelled bead polymer;
combining the swelled bead polymer, the compounds of the formula (I), and the compounds of the formula (II) to form a mixture; and
adding the sulfuric acid to the mixture.

6. The process according to claim 1, wherein the hydrolyzing is in the presence of aqueous or alcoholic solutions of an alkali metal hydroxide at temperatures of about 100° C. to about 250°C.

7. The process according to claim 1, wherein the monodisperse bead polymer comprises macroporous, monodisperse bead polymer, and the aminomethylated bead polymer produced is a macroporous aminomethylated bead polymer.

8. The process according to claim 1, wherein the 1,3-dichloropropane is both a swelling agent and a solvent in the process, and no additional swelling agent or solvent is used.

9. The process according to claim 1, wherein:
the process further comprises polymerizing monomer droplets of a mixture comprising styrene, divinylbenzene, and at least one initiator to produce the monodisperse bead polymer, wherein:
    the initiator is selected from a group consisting of dibenzoyl peroxide, dilauroyl peroxide, bis(p-chlorobenzoyl) peroxide, dicyciohexyl peroxydicarbonate, tert-butyl peroctoate, tert-butyl peroxy-2-ethylhexanoate, 2,5-bis(2-ethylhexanoyiperoxy)-2,5-dimethylhexane, tert-amylperoxy-2-ethylhexane, 2,2'-azobis(isobutyronitrile), and 2,2'-azobis(2-methylisobutyronitrile) and mixtures of these compounds; and
    the monomer droplets are microencapsulated with polyesters, natural polyamides, synthetic polyamides, polyurethanes, or polyureas;
$R_1$=H; and
the 1,3-dichloropropane is both a swelling agent and a solvent in the process, and the amount of 1,3-dichloropropane used, based on a total amount of solvents and swelling agents used, is at least 95% by weight.

10. The process according to claim 9, wherein at least one further swelling agent and/or solvent, in addition to the 1,3-dichloropropane, is used, and the at least one further swelling agent and/or solvent comprises at least one swelling agent and/or solvent selected from the group consisting of: 1,2-dichloroethene, 1,2-dichloropropane, 1,4-dichlorobutane, 1,6-dichlorohexane, methylene chloride, carbon tetrachloride, trichloroethane, chlorobenzene, 1,2-dichlorobenzene, nitropropane, nitrobenzene, cyclohexane, and methylcyclohexane.

11. The process according to claim 9, wherein:
the polymerizing of the monomer droplets is in the presence of a porogen;
the contacting is conducted at a temperature of about 55° C. to about 75° C.;
an amount of the 1,3-dichloropropane is about 6 to about 9 mol per mole of compounds of the formula (I); and
the contacting comprises:
    swelling the bead polymer in the 1,3-dichloropropane to form swelled bead polymer;
    combining the swelled bead polymer, the compounds of the formula (I), and the compounds of the formula (II) to form a mixture; and
    adding the sulfuric acid to the mixture; and
the hydrolyzing is in the presence of aqueous or alcoholic solutions of an alkali metal hydroxide at temperatures of about 100° C. to about 250° C. to produce macroporous aminomethylated bead polymer.

12. The process according to claim 11, wherein:
an amount of the compounds of the formula (I) is about 0.6 mol per mole of sulfuric acid; and
the amount of 1,3-dichloropropane used, based on a total amount of swelling agent and solvent used, is 100% by weight.

\* \* \* \* \*